United States Patent
Roskind (10) Patent No.: US 7,174,454 B2
(45) Date of Patent: Feb. 6, 2007

(54) SYSTEM AND METHOD FOR ESTABLISHING HISTORICAL USAGE-BASED HARDWARE TRUST

(75) Inventor: James A. Roskind, Redwood City, CA (US)

(73) Assignee: America Online, Inc., Dulles, VA (US)

(*) Notice: Subject to any disclaimer, the term of this patent is extended or adjusted under 35 U.S.C. 154(b) by 187 days.

(21) Appl. No.: 10/465,163

(22) Filed: Jun. 18, 2003

(65) Prior Publication Data

US 2004/0199770 A1    Oct. 7, 2004

Related U.S. Application Data

(63) Continuation-in-part of application No. 10/276,842, filed on Nov. 19, 2002.

(51) Int. Cl.
*H04L 9/00* (2006.01)
*H04L 9/32* (2006.01)

(52) U.S. Cl. .................. 713/155; 726/3; 705/66; 705/67

(58) Field of Classification Search ............... 713/200, 713/155; 726/3; 705/66, 67
See application file for complete search history.

(56) References Cited

U.S. PATENT DOCUMENTS

| | | | |
|---|---|---|---|
| 5,214,702 A | | 5/1993 | Fischer .................. 380/30 |
| 5,684,951 A | * | 11/1997 | Goldman et al. ............. 726/6 |
| 5,721,780 A | | 2/1998 | Ensor et al. ............... 380/25 |
| 5,751,812 A | * | 5/1998 | Anderson ................. 713/155 |
| 5,751,814 A | | 5/1998 | Kafri |

(Continued)

FOREIGN PATENT DOCUMENTS

EP    1 197 828 A1    4/2002

(Continued)

OTHER PUBLICATIONS

Teresa F. Lunt, R. Jagannathan, Rosanna Lee, Alan Whitehurst, Sherry Listgarten, "Knowledge-Based Intrusion Detection", AI Systems in Government Conference, 1989, Proceedings of the Annual Washington, DC, Mar. 27-31, 1989, pp. 102-107.*

(Continued)

*Primary Examiner*—Ayaz Sheikh
*Assistant Examiner*—Kaveh Abrishamkar
(74) *Attorney, Agent, or Firm*—Michael A. Glenn; Glenn Patent Group (57) ABSTRACT

Establishing trust according to historical usage of selected hardware involves providing a usage history for a selected client device; and extending trust to a selected user based on the user's usage history of the client device. The usage history is embodied as signed statements issued by a third party or an authentication server. The issued statement is stored either on the client device, or on an authentication server. The usage history is updated every time a user is authenticated from the selected client device. By combining the usage history with conventional user authentication, an enhanced trust level is readily established. The enhanced, hardware-based trust provided by logging on from a trusted client may eliminate the necessity of requiring secondary authentication for e-commerce and financial services transactions, and may also be used to facilitate password recovery and conflict resolution in the case of stolen passwords.

37 Claims, 6 Drawing Sheets

U.S. PATENT DOCUMENTS

| | | | |
|---|---|---|---|
| 5,825,880 A | 10/1998 | Sudia et al. | 380/21 |
| 5,850,443 A | 12/1998 | Van Oorschot et al. | 380/21 |
| 5,875,296 A * | 2/1999 | Shi et al. | 726/5 |
| 5,892,900 A | 4/1999 | Ginter et al. | 395/186 |
| 5,987,134 A | 11/1999 | Shin et al. | 380/25 |
| 6,070,243 A | 5/2000 | See et al. | 713/201 |
| 6,141,759 A * | 10/2000 | Braddy | 726/14 |
| 6,205,479 B1 | 3/2001 | Dulai et al. | 709/225 |
| 6,308,274 B1 | 10/2001 | Swift | 713/201 |
| 6,327,652 B1 * | 12/2001 | England et al. | 713/2 |
| 6,349,338 B1 | 2/2002 | Seamons et al. | 709/229 |
| 6,421,768 B1 * | 7/2002 | Purpura | 711/164 |
| 6,425,089 B1 | 7/2002 | Tsai | 713/500 |
| 6,640,238 B1 | 10/2003 | Bowman-Amuah | |
| 6,658,091 B1 | 12/2003 | Naidoo | |
| 6,668,322 B1 * | 12/2003 | Wood et al. | 713/182 |
| 6,678,731 B1 * | 1/2004 | Howard et al. | 709/225 |
| 6,985,953 B1 * | 1/2006 | Sandhu et al. | 709/229 |
| 2001/0034847 A1 | 10/2001 | Gaul | |
| 2001/0056405 A1 | 12/2001 | Muyres | |
| 2002/0042884 A1 | 4/2002 | Wu | |
| 2003/0041141 A1 | 2/2003 | Abdelaziz | |
| 2004/0024851 A1 | 2/2004 | Naidoo | |
| 2004/0041910 A1 | 3/2004 | Naidoo | |
| 2004/0064568 A1 | 4/2004 | Arora | |
| 2004/0064693 A1 | 4/2004 | Pabla | |
| 2004/0086088 A1 | 5/2004 | Naidoo | |
| 2004/0086089 A1 | 5/2004 | Naidoo | |
| 2004/0086090 A1 | 5/2004 | Naidoo | |
| 2004/0086091 A1 | 5/2004 | Naidoo | |
| 2004/0088347 A1 | 5/2004 | Yeager | |
| 2004/0088369 A1 | 5/2004 | Yeager | |
| 2004/0093268 A1 | 5/2004 | Ramchandani | |
| 2004/0199770 A1 | 10/2004 | Roskind | |
| 2005/0132060 A1 | 6/2005 | Mo | |
| 2005/0187934 A1 | 8/2005 | Motsinger | |
| 2005/0188079 A1 | 8/2005 | Motsinger | |
| 2005/0188080 A1 | 8/2005 | Motsinger | |
| 2005/0188222 A1 | 8/2005 | Motsinger | |
| 2005/0188423 A1 | 8/2005 | Motsinger | |
| 2005/0198099 A1 | 9/2005 | Motsinger | |
| 2005/0203773 A1 | 9/2005 | Soto | |

FOREIGN PATENT DOCUMENTS

| | | |
|---|---|---|
| WO | WO 98 51029 A | 11/1998 |
| WO | WO 99/64967 A1 | 12/1999 |
| WO | WO 99 65207 | 12/1999 |
| WO | WO 00/07087 A | 2/2000 |
| WO | WO 01/38999 A1 | 5/2001 |
| WO | WO 01/73553 A1 | 10/2001 |
| WO | WO 01/90859 A1 * | 11/2001 |
| WO | WO 02/32047 A1 | 4/2002 |
| WO | WO 2004/044688 A2 | 5/2004 |
| WO | WO 2004/114082 A2 | 12/2004 |
| WO | WO 2005/060138 A2 | 6/2005 |
| WO | WO 2005//069823 A2 | 8/2005 |

OTHER PUBLICATIONS

C. Abad and J. Taylor and C. Sengul and W. Yurcik and Y. Zhou and K. Rowe, "Log Correlation for Intrusion Detection: A Proof of Concept",In Proc. of the 19th Annual Computer Security Applications Conf. (ACSAC 2003).*

Lunt; Knowledge-Based Intrusion Detection; Stanford University, Computer Science Department.

Crosbie, M. et al.; Active Defense of a Computer System using Autonomous Agents; Department of Computer Sciences, Purdue University, West Lafayette, IN; Feb. 15, 1995.

Sequeira, K. et al.; ADMIT: Anomaly-Based Data Mining for Intrusions; Computer Science Department, Rensselaer Polytechnic Institute, Troy, NY.

Lane, T. et al.; An Application of Machine Learning to Anomaly Detection; School of Electrical and Computer Engineering, Purdue University, West Lafayette, IN; Feb. 14.

Abad, C. et al.; Log Correlation for Intrusion Detection: A Proof of Concept; Department of Computer Science, University of Illinois at Urbana-Champaign.

Endler, D.; Intrusion Detection Applying Machine Learning to Solaris Audit Data; Department of Electrical Engineering and Computer Science, Tulane University, New Orleans.

Gonzalez, L.; Current Approaches to Detecting Intrusions; Nova Southeastern University, Graduate School of Computer and Information Sciences, Fort Lauderdale, FL; 2002.

Lane, T. et al.; Detecting the Abnormal: Machine Learning in Computer Security; School of Electrical and Computer Engineering, Purdue University, West Lafayetta, IN; Januar.

Furui, Sadaoki. Cepstral Anaylsis Technique For Automatic Speaker Verification. IEEE Transactions on Acoustics. Speech, and Signal Processing. vol. ASSp-9. No. 2. Apr. 1981.

Schalk, Thomas. Speaker Verification Over the Telephone Network. Feb./Mar. 1991. Dallas, TX. pp. 32-35.

Smith, Sidney L. Authenticating Users by Word Association. Dec. 1987. Computers and Security.

* cited by examiner

SYSTEM AND METHOD FOR ESTABLISHING HISTORICAL USAGE-BASED HARDWARE TRUST

CROSS REFERENCE TO RELATED APPLICATION

This application is a Continuation-in-part of U.S. patent application Ser. No. 10/276,842, filed Nov. 19, 2002.

BACKGROUND OF THE INVENTION

1. Field of the Invention

The invention relates generally to the field of network security. More particularly the invention relates to a system and method for using the usage history of a particular piece of hardware to establish trust.

2. Technical Background

In the field of authentication, there are generally three possible ways for a user to authenticate. The authentication can depend on what the user knows, for example, a password; what the user is, for example a fingerprint or a retinal pattern; or what the user has, for example, trusted hardware such as a keyed smart card or the like. As telecommunication and data networks continue to proliferate, the issue of network security becomes more and more important. Any one of the above alternatives is conventionally thought to provide good authentication.

At one time, a conventional logon procedure, in which the user provided a user name or logon and a password to gain access to network services, provided adequate authentication for most purposes. While such a level of security remains sufficient for many applications, the increasing availability of such services as financial services, retail shopping, and healthcare information services over publicly accessible networks dictates a need for a level of authentication that cannot be provided through the use of simple password-based logon procedures, without more.

Confounding the issue is the fact that passwords are easily compromised. Passwords can be compromised in a number of ways. Users often keep their passwords written on easily found Post-It® notes or scraps of paper, instead of committing them to memory. Users may disclose their passwords to friends and co-workers. What's more, users are often unwilling to keep track of multiple passwords for different applications, so they end up using a single default password, although security experts strongly recommend use of a unique password for each application. Hackers can use computer programs capable of systematically trying various alphanumeric combinations to launch brute force attacks on systems they are trying to access until a combination is found that grants them access to the targeted system.

Establishing trust between a client and a server machine through the mere provision of a password is insufficient for transactions involving highly sensitive information. As such transactions become commonplace, the need for a relatively uncomplicated way of establishing higher levels of trust between becomes more acute. One way of providing increased trust is through the combination of at least two of the three alternatives described above. It is generally thought that combining two methods of authentication provides an excellent level of trust.

The art provides examples of various schemes for establishing higher levels of trust. For example, M. Ensor, T. Kowalski, A. Primatic, User-transparent Security method and apparatus for authenticating user terminal access to a network, U.S. Pat. No. 5,721,780 (Feb. 24, 1998) describe a method and apparatus for implementing security in data and telecommunications networks that is independent of and transparent to users. When a user terminal connects to a network control center, the network control center generates an encrypted password based on the user terminal's network coupling identifier. The password is downloaded to the terminal and simultaneously saved by the network control center. Subsequently, when a user attempts to access the network, the network control center retrieves the password from the terminal and compares it with the stored copy. If there is a match, network access is granted. With each logon from the terminal, a new password is generated and downloaded to the user terminal.

While the exchange of passwords described by Ensor, et al. allows a user terminal to be established as trusted on a session-by-session basis, the trust is based on a static designation that provides no information about the terminal's usage history. Furthermore, Ensor, et al. fail to contemplate combining the method described with other methods of authentication to provide superior quality authentication.

K. Seamons, W. Winsborough, Trust negotiation in a client/server data processing network using automatic incremental credential disclosure, U.S. Pat. No. 6,349,338 (Feb. 19, 2002) describe a system in which trust is negotiated between two unfamiliar data processing apparatus by incrementally exchanging credentials. Providing multiple opportunities for exchange of credentials makes it possible to negotiate a high level of trust between two machines previously unfamiliar with each other than a single exchange of credentials. The approach provided by Seamons, et al. involves the iterative exchange of credentials and credential access policies, wherein the credentials are primarily issued by various third parties and describe the holder of the credential. The approach does not contemplate establishing a machine as a trusted machine based on historical usage of the machine that doesn't involve multiple exchanges of third party credentials. There is also no teaching of combining the approach with other approaches to provide an even higher level of trust.

K. Shin, K. Kobayashi, T. Aratani, Device and method for authenticating access rights to resources, U.S. Pat. No. 5,987,134 (Nov. 16, 1999) provides an approach that requires several different components including challenging data, user identifying information and an access ticket. Shin, et al. are primarily concerned with authenticating a user, rather than establishing a particular piece of hardware as trusted. They do not contemplate using historical usage information in combination with other means of authentication as a means of negotiating a high level of trust.

It would advance the art significantly to provide a means of establishing a particular piece of hardware, such as a client machine, as trusted hardware. It would be desirable to provide a method of establishing a trusted machine based on the machine's history of use, eliminating the necessity of exchanging credentials issued by third parties such as certification authorities. Furthermore, it would be a great advantage to provide a way of negotiating increased trust by combining historical usage information from a trusted machine with other authentication methods, such as user passwords.

SUMMARY OF THE INVENTION

Establishing trust according to historical usage of selected hardware includes: providing a usage history for a selected client device; and extending trust to a selected user at a level at least partially based on the user's history of use of the selected client device. The usage history is embodied as signed statements issued by a third party for example, or an authentication server. In one embodiment of the invention, the issued statement is downloaded to the selected client device, and is provided by the client device when a user requests service and/or access from a network server. In another embodiment, the issued statement is stored on an authentication server, and is checked after provision of a public key from a key pair by the selected client device. The usage history is updated every time a user is authenticated from the selected client device. By combining the usage history with a conventional user authentication, a greater level of trust may be established than through user authentication alone in a very simple manner. The enhanced trust provided by logging on from a trusted client may eliminate the necessity of requiring secondary authentication for e-commerce and financial services transactions. In the case of lost or stolen passwords, the enhanced hardware-based trust facilitates password recovery and conflict resolution between the legitimate user logging on from the trusted hardware and the thief logging on from another client, and password recovery, when the thief has changed the password.

DETAILED DESCRIPTION

I.

The invention is embodied in an adaptive multi-tier authentication system in a computer environment. A system according to the invention automatically adapts to the user's login patterns. In addition, the invention provides a system that does not require additional hardware from the service provider by using a query-based security system.

Users commonly have their passwords compromised (lost or stolen). Attackers can typically use the stolen username/password to impersonate a user from a remote site. This compromises the service that the attackers infiltrate, which is costly to the service providers. The invention makes this type of impersonation more difficult by providing secondary tiers of authentication which are used ONLY when the user attempts a connection from a new environment (ie., from a new computer, kiosk, etc.).

Figure 1:
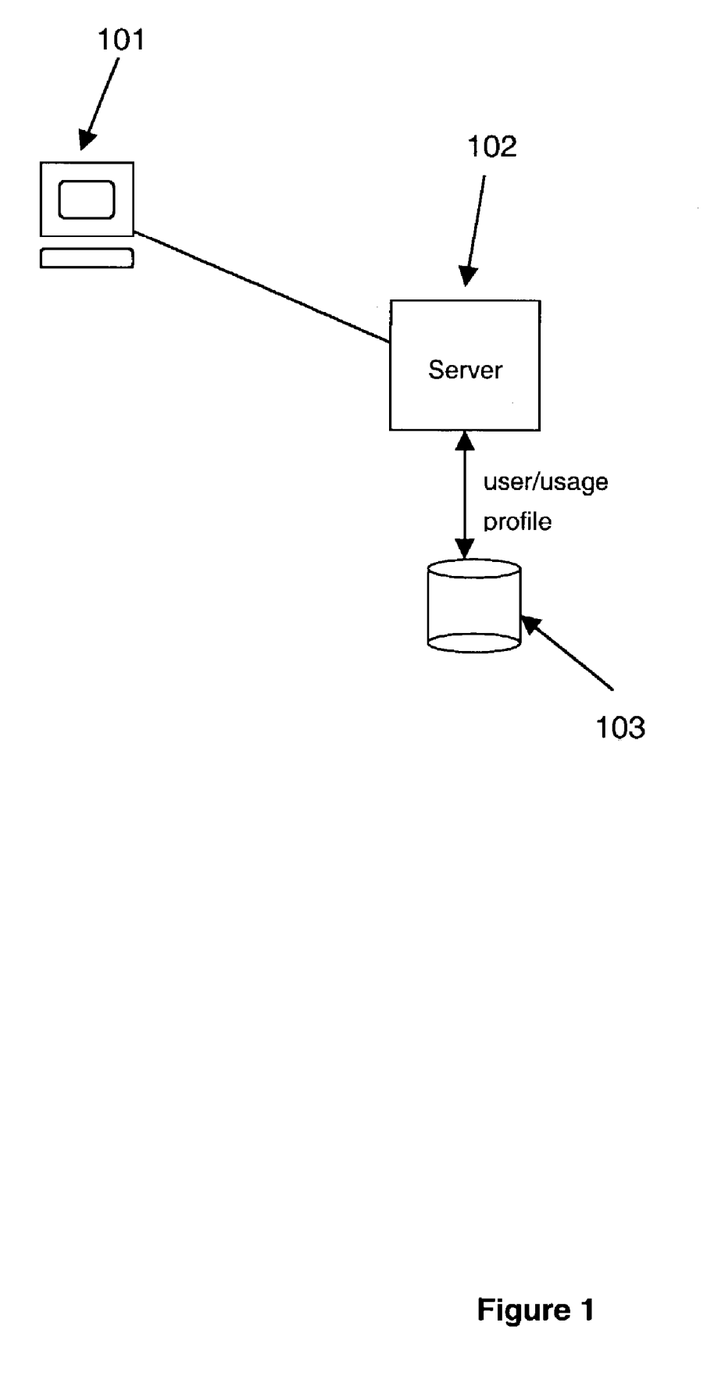
FIG. 1 is a block schematic diagram of a user remote access scenario according to the invention.

Referring to FIG. 1, a simple user interface scenario is shown. The user 101 logs onto the server 102. The server retrieves the user's stored use profile 103. The location where the user 101 is accessing the server is checked against the user's profile to determine a trust level for the session. The server 102 determines if any additional security measures must be taken based on the trust level.

A preferred embodiment of the invention analyzes the user's use of a service and typical access points to augment the trust level of each access point. If the user is always dialing in from home to access a service such as AOL, the invention observes the pattern and, after a while, determines that the trust level is high when the user accesses the service from home. At that point, the invention will allow immediate login into the service without asking for any additional information.

When the user suddenly goes travelling and accesses the service on the road, then the user's trust level is downgraded and more authentication questions are asked before allowing access. For example, the service may tell the user "We are surprised to see you dialing in from California. We just need to do a little extra background check on your identity. How many dogs did you tell us that you have? What are their names?"

Figure 2:
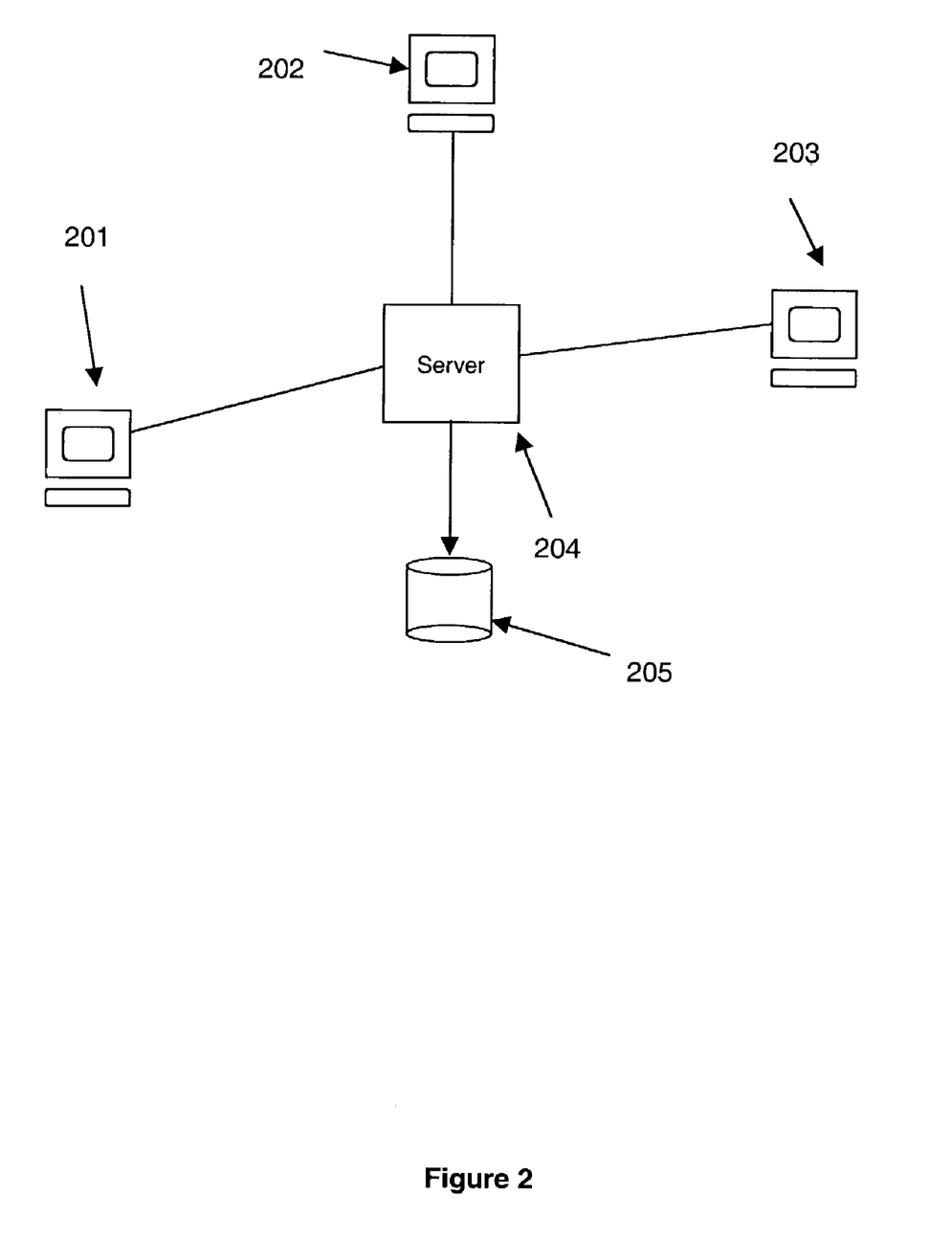
FIG. 2 is a block schematic diagram of a multiple access point example according to the invention.

With respect to FIG. 2, the user may be a salesperson and travel to different cities. This user's patterns may be random at best because his access points are all across the country 201, 202, 203. The server 204 takes this into account and determines that this is the user's normal pattern. The server 204 records this fact in the user's profile 205.

However, if the user logs in to the server 204 at one location 201 and then another user logs in using the same identity at another location 203, the server 204 will immediately downgrade the trust level of the second location and ask more authentication questions. This also applies to the situation when a user logs in the United States, for example, and a similar login occurs in Japan five hours later. The invention knows that the time frame is improbable.

The invention automates the process of tracking information such as IP addresses, where the user dialed in from, and the access times. A profile of the combination of data is used to as a basis to determine the level of trust. For example, the invention uses the following criteria to adapt authentication for a system:

Where the user is dialing in from (e.g., phone number).
Type of machine being used (e.g., Mac or PC).
Operating system on the machine.
Cookies/tags that are on the machine.
IP address (e.g., same IP address or same subnet).

When a user logs on, some distinct aspect of the computer is recorded. In the typical case, a random token is written into memory, or onto the disk of the client computer. Logon proceeds as usual ONLY if the existing token is located on the computer used for the login (e.g., an identifying cookie would be used on a per-computer basis for HTTP transactions). When the element that is used to identify the computer does not match the user's "standard list of computers used" then some secondary questions are asked as described above (e.g., "What is your birthday?", "What is your home phone number?") before completing the authentication.

The system adapts and learns new sites that the user logs in from, and then proceeds to use the minimal username/password from those sites only. Other techniques could be used to identify the logon environment as listed above (i.e., IP address or dial in line), but the creation of a unique mark (file, cookie, etc.) ensures verification of the environment.

The user is not burdened with having to carry anything with him that could to be lost or stolen (e.g., smart cards). This approach is analogous to traditional human identification systems, where, when the user is known, then additional proof of ID is not requested.

The user immediately knows when something is wrong when the invention suddenly asks for more information than usual. For example, if the user logs in from home, which is a normal situation, and the system asks for more information than normal, such as the user's dog's name. The unusual request would be an indicator to the user that something may be wrong, prompting the user to call into customer support to get more information.

Figure 3:
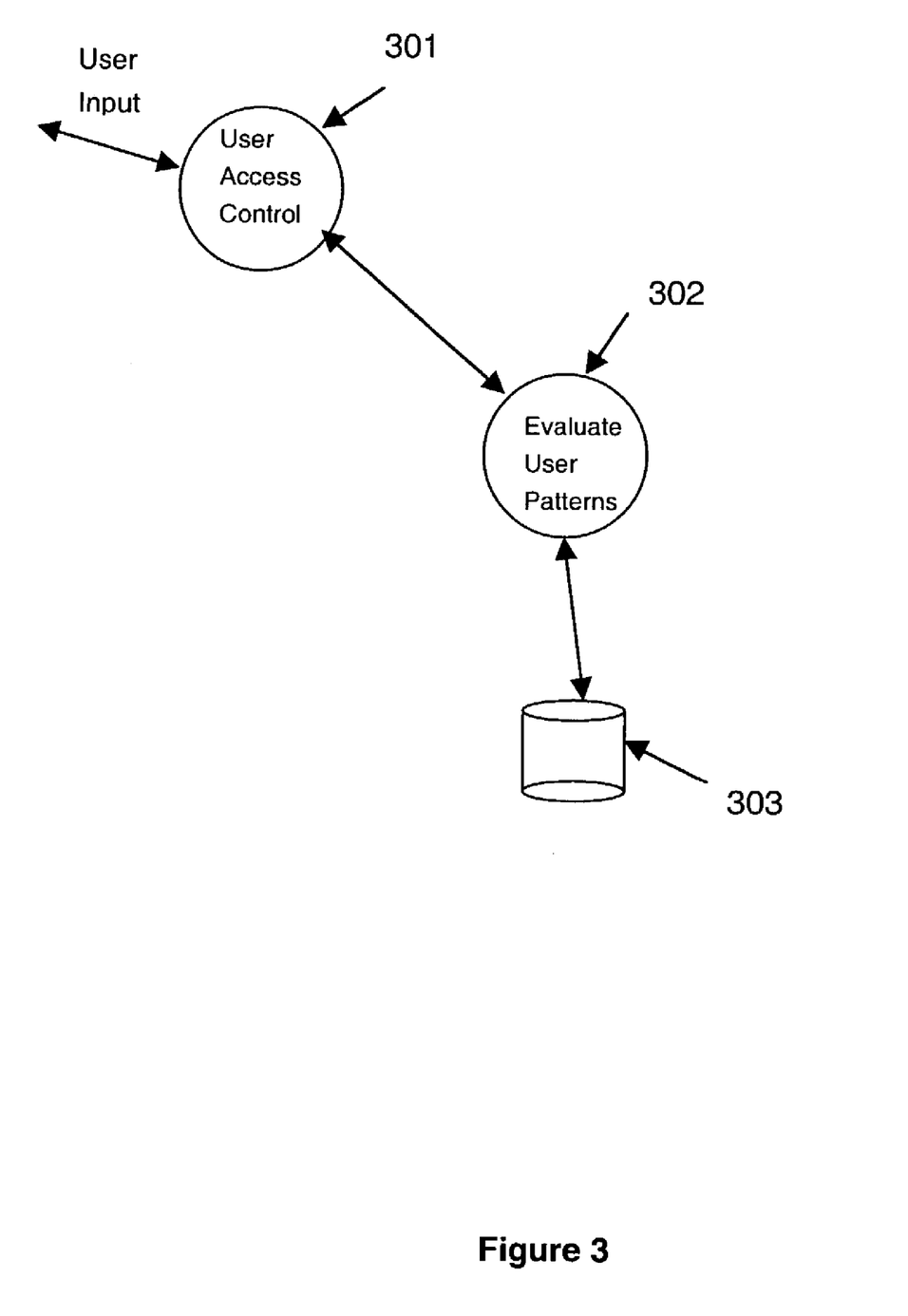
FIG. 3 is a block schematic diagram of a task viewpoint of the invention according to the invention.

Referring to FIG. 3, the User Access Control module 301 accepts user input such as login attempts and responses to the system's questions. The User Access Control module 301 has the responsibility to search and check for information such as IP address, originating phone number, or cookies on the user's machine. The Evaluate User Patterns module 302 takes the information obtained from the User Access Control module 301 and compares it to the usage information from the user/usage profile 303 for the specific user. The user/usage profile contains all of the user information that the user used to establish the account and also the usage profile detailing the user's access patterns.

The trust level of the current user login location is calculated and the Evaluate User Patterns module 302 determines if any additional questions to the user are required. Questions are sent through the User Access Control module 301 to the user. The user's answers are relayed from the User Access Control module 301 back to the Evaluate User Patterns module 302. The Evaluate User Patterns module 302 grants or denies access based on the trust level and answers for any questions that it asked. The Evaluate User Patterns module 302 updates the user/usage profile 303 for the user with the information just obtained.

II.

The fact that a typical user logs onto a server from a single machine time and again over an extended period suggests that when the user logs on, or tries to log on from the single machine, either less authentication should be required, or a higher trust level should be established. The higher trust level may be used to enable such things as financial transactions or even logging on or changing passwords without knowing the current password.

Figure 4:
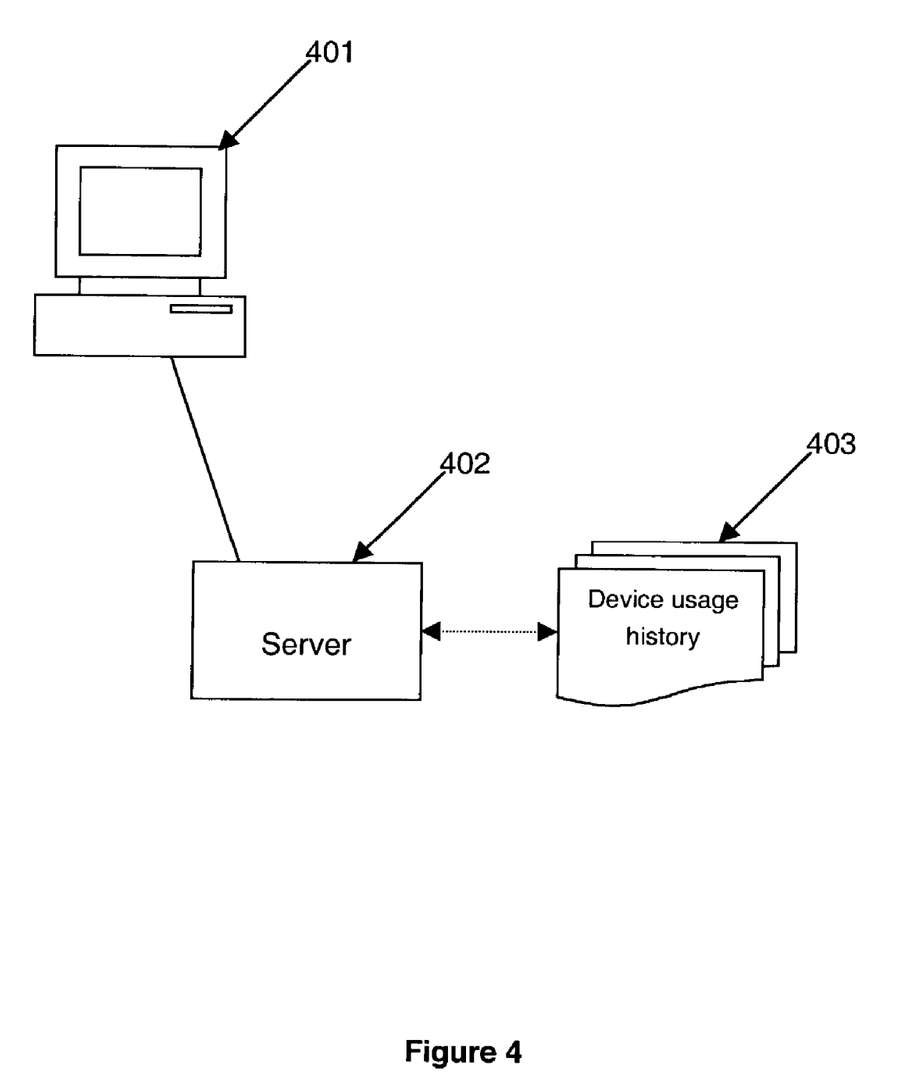
FIG. 4 provides a generalized schematic diagram of a system for establishing historical usage-based hardware trust according to the invention.

FIG. 4 shows a schematic diagram of a system for establishing historical usage based hardware trust according to the invention. Typically, the system includes a client 401 and a server 402. The client device may be a desktop or laptop computer, a PDA (personal digital assistant) or information manager such as a PALM PILOT (PALM INC., MILPITAS Calif.), or a WAP (wireless access protocol) device such as a cellular telephone or a pager. A selected user of a selected client device logs onto the server 402, or another server, from time to time, to request service and/or access. For the sake of description, the server has been shown as a single machine. In actual practice, the server may constitute more than one server. In an exemplary embodiment of the invention, the server 402 may be an authentication server for an online service such as AOL (AOL INCORPORATED, DULLES Va.). Following authentication, the user may be granted service/and or access for a web server, an application server or a database server, for example. In another embodiment of the invention, the server from which service and/or access is sought additionally authenticates the user.

In addition to the client device 401 and the server 402, the system includes a usage history 403 for the client device. The usage history typically consists of one or more signed statements providing records of the client device's usage history. While the practitioner of ordinary skill will readily be able to discern parameters for the usage history, the usage history typically includes dates and times of use by the selected user. The usage history also includes information regarding significant events, such as password changes to user accounts that are made from the client. In one embodiment of the invention, the signed statements embodying the usage history are issued by the server 402, in which case, the usage history includes the client device's logon history to that particular server. In another embodiment of the invention, the signed statements are issued by an independent credentialing authority, in which case, the usage history includes usage information for more than one target server. The statements may be signed by attaching a message authentication code, such as a keyed hash, rendering use of keys unnecessary. When the user logs on from the selected client 401, the server 402 evaluates the usage history 403.

As indicated above, the invention is based on the recognition that a user often logs onto an online service from the same client time and again over an extended period. When such a usage history can be shown for a particular client, it merits tagging the client as a trusted machine. The client's status as a trusted machine indicates that when the selected user logs on, or attempts to log on from the trusted client, it is permissible to require less authentication, or that a higher trust level should be established. Thus, the hardware is being certified because it is being used. The current system and method are metaphors for the common real-world occurrence of extending a higher level of trust to a person based on familiarity. For example, a security guard is less likely to be suspicious of someone whom they see every day. Typically, the usage history is evaluated in connection with a conventional logon, during which the user provides a password, or some other secret. Additional security measures are possible. For example, the signed statements may be obscured and/or the password or other secret can be encrypted into the statement.

Figure 5:
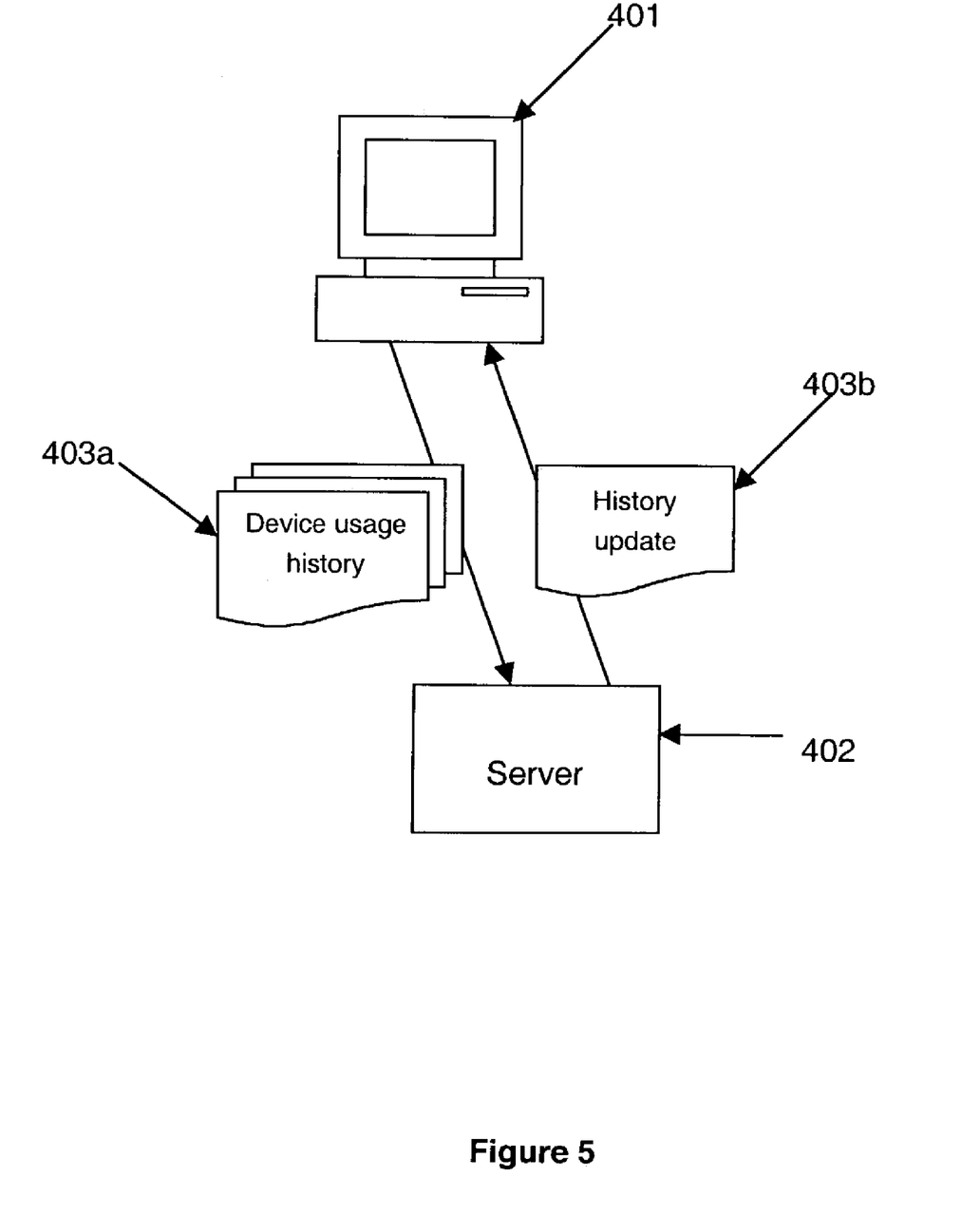
FIG. 5 provide a schematic diagram of a first embodiment of the system of FIG. 4 according to the invention.

FIG. 5 shows an embodiment of the invention, wherein the usage history 403a is stored on the client 401, and is transmitted from the client to the server 402 each time the user logs on. Following logon, the server updates the usage history by issuing a new signed statement 403b, which is subsequently stored on the client 401.

It should be noted that it is an object of the invention to provide a level of security acceptable to most users in as simple and convenient a manner as possible. The conventional wisdom in the world of computer security is that more security is almost always better. However, in actual practice, users generally are willing to sacrifice some security for convenience and expediency, as shown by the fact that most users use the same password over and over, rather than taking the trouble to formulate and remember separate passwords for each individual need, as they are often advised to do. Thus, the invention provides an acceptable level of increased security over single mode authentication as conveniently and unobtrusively as possible.

Figure 6:
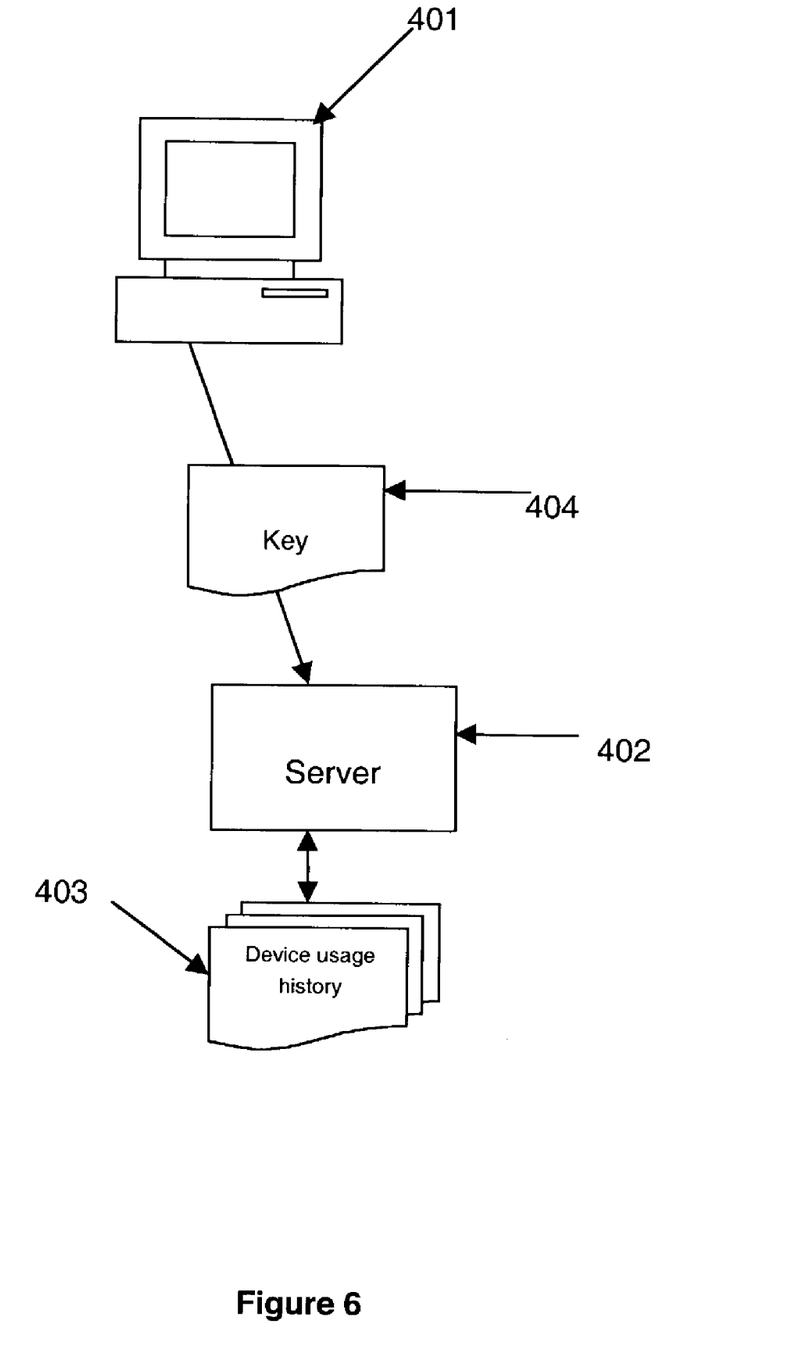
FIG. 6 provides a schematic diagram of a second embodiment of the system of FIG. 4 according to the invention.

FIG. 6 shows an embodiment of the invention in which the usage history 403 is stored on the server 402. In this embodiment of the invention, a key pair, including public and private keys, for the client 401 is provided. Typically, the key pair is stored in key repositories, for example in the ROM (read only memory) of the selected client. The private key (not shown) functions to establish the identity of the client 401, because the client, apart from the private key, otherwise contains little specific identifiable information. During logon, the public key 404 is pushed to the server 402, which allows the server 402 to access the usage history 403 for the client stored at the server. Following logon, the usage history is updated.

The invention is particularly advantageous in that it is a completely passive arrangement, relying on the fact that no one, other than the selected user, has physical access to the selected client. A hacker, attempting to circumvent the current system would need to have physical access to the client to pirate the key pair or the usage history.

One of the most useful applications of the invention is in password recovery when a user has forgotten their password, or when a hacker has stolen it. IT professionals know that password recovery imposes a significant burden in lost man-hours and wasted computing resources and poses a great inconvenience to users. When a user, having forgotten their password, attempts to logon from the trusted client using an incorrect password, the server, after evaluating the usage history and seeing that the logon originates from a trusted machine, can allow the user to change the account password, based on the increased level of trust inferred from the fact that is it unlikely that anyone other than the selected user has physical access to the trusted client. Allowing the password to be changed easily spares the user considerable inconvenience and spares the expense and waste of resources on the administrative side. In a case where a hacker has stolen the original password and, using the stolen password, has changed the account password, the user attempts to log on from the trusted machine with the original password. The server, detecting that the logon from the original user originates from the trusted client can allow the original user to change the password, based on implied trust from the signed statements. In another case, the rightful user of the account may change the password, after which someone else attempts to change the password from another client device. The server, seeing that the password was originally changed by a user logging on from a trusted client, resolves the conflict in favor of the user on the trusted client Similarly, in the case of two users attempting to log on from different clients with the same password, the server resolves the conflict in favor of the user logging on from the trusted client.

The invention also finds important application in the fields of e-commerce and network-based financial services. Many services require a second password or other credential to be provided when a higher level of authentication is needed. For example, Amazon.com requires no password to buy a product, but does require a password to change the address that the product is automatically shipped to (in a password-free purchase). AOL requires a second "shopping" password to perform an actual purchase, above and beyond the login password needed to access the email account and other services. In both cases, the signed statements (and implied trust in the hardware holding those statements) may be used in place of the secondary password. Thus, additional trust is deduced based on the signed statement.

The invention is also advantageously deployed in deterring hackers. For example, hackers often launch brute force attacks, using software applications that automate the process of systematically trying different alphanumeric combinations to find the correct password. The server, recognizing that a login originates from a trusted client, can authenticate the password promptly. When the login originates from a non-trusted client, the server can extend the time period required for authenticating the password. The increased time can be long enough to encourage those attempting to hack into the account to abandon the effort.

The invention can also be used to implement security policies. For example, changes to the account, such as changing passwords or preferences, or creating new sub-accounts may only be allowed when the user logs in from the trusted machine.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for establishing trust across a plurality of log in sessions for one or more client devices according to historical usage of selected hardware, comprising the steps of:
   tracking information unique to each log in for at least a selected client device of said client devices;
   determining an identity unique to said selected client device associated with each said log in;
   comparing said identity of said client device to a stored use profile associated with a user, said stored use profile comprising a list of client devices used by said user;
   determining whether said identified client device matches one of client devices listed in said stored use profile;
   providing a usage history for said selected client device, wherein said usage history is changeable as a function of any of frequency and number of tracked log ins associated with said selected client device and said determined identity of said selected client device for each said log in;
   updating any of said usage history and said stored use profile as a result of each said log in; and
   extending an increase in trust to said user at a level at least partially based on any of said frequency and said number of tracked log ins associated with said selected client device for said user.

2. The method of claim 1, wherein said usage history comprises at least one statement signed by an issuer.

3. The method of claim 2, wherein said issuer comprises any of:
   an authenticating server; and
   a third party.

4. The method of claim 3, wherein said step of providing said usage history comprises the steps of:
   creating said statement by said issuer; and
   storing said statement on said authenticating server.

5. The method of claim 4, further comprising the steps of:
   providing a key pair for said client, said key pair including private and public keys, wherein said private key establishes identity of said client;
   transmitting said public key to said authenticating server; and
   accessing said statement by said authenticating server based on said public key.

6. The method of claim 3, wherein said step of providing said usage history comprises the steps of:
   creating said statement by said issuer;
   downloading said statement from said issuer and storing on said client device; and
   furnishing said usage history by said client with a request for service and/or access.

7. The method of claim 2, further comprising the step of: furnishing user information with said usage history.

8. The method of claim 7, wherein said user information comprises at least said selected user's password.

9. The method of claim 7, wherein said user information is encrypted into said statement.

10. The method of claim 1, wherein said step of extending an increase in trust comprises:

determining a level of trust according to said selected user's frequency of use of said client device, wherein a frequent user is granted enhanced trust over an infrequent user.

11. The method of claim 1, further comprising the step of:
granting or denying service and/or access according to said level of trust.

12. The method of claim 2, further comprising the step of:
when said selected user requests service and/or access from said client device, said requested service or access requiring secondary authentication, accepting a statement showing frequent use of said device by said selected user as a credential for said secondary authentication.

13. The method of claim 2, further comprising the step of:
requiring provision of a statement showing frequent use of said device by said selected user as a credential for changing account preferences.

14. The method of claim 2, further comprising the step of:
accepting a statement showing frequent use of said device by said selected user as a credential to resolve a conflict between said selected user and a second user using a second client device, wherein said second client device lacks usage history for said selected user.

15. The method of claim 2, further comprising the step of:
accepting a statement showing frequent use of said device by said selected user as a credential in place of said selected user's password when said selected user's password is stolen and changed by a third party using a second client device, wherein said second client device lacks usage history for said selected user.

16. The method of claim 2, further comprising the step of:
discouraging attacks by hackers based on said statements.

17. The method of claim 16, wherein said step of discouraging attacks by hackers comprises:
extending a time period associated with authentication of said selected user's password when provided from a second client device, wherein said second client device lacks usage history for said selected user.

18. A method for establishing trust according to historical usage of selected hardware across a plurality of log in sessions, said method implemented on computer-readable code embodied in a tangible medium associated with a computer program product, comprising the steps of:
tracking information unique to each log in for at least a selected client device;
determining an identity unique to said selected client device associated with each said log in;
comparing said identity of said client device to a stored use profile associated with a user, said stored use profile comprising a list of client devices used by said user;
determining whether said identified client device matches one of client devices listed in said stored use profile;
providing a usage history for said selected client device, wherein said usage history is changeable as a function of any frequency and number of tracked log ins associated to said selected client device and said determined identity of said selected client device for each said log in;
updating any of said usage history and said stored use profile as a result of each said log in; and
extending an increase in trust to said user at a level at least partially based on any of said frequency and said number of tracked log ins associated with said selected client device for said user.

19. The method of claim 18, wherein said usage history comprises at least one statement signed by an issuer.

20. The method of claim 19, wherein said issuer comprises any of:
an authenticating server; and
a third party.

21. The method of claim 20, wherein said step of providing said usage history comprises the steps of:
creating said statement by said issuer; and
storing said statement on said authenticating server.

22. The method of claim 21, further comprising the steps of:
providing a key pair for said client, said key pair including private and public keys, wherein said private key establishes identity of said client;
transmitting said public key to said authenticating server; and
accessing said statement by said authenticating server based on said public key.

23. The method of claim 20, wherein said step of providing said usage history comprises the steps of:
creating said statement by said issuer;
downloading said statement from said issuer and storing on said client device; and
furnishing said usage history by said client with a request for service and/or access.

24. The method of claim 19, further comprising the step of:
furnishing user information with said usage history.

25. The method of claim 24, wherein said user information comprises at least said selected user's password.

26. The method of claim 24, wherein said user information is encrypted into said statement.

27. The method of claim 18, wherein said step of extending an increase in trust comprises:
determining a level of trust according to said selected user's frequency of use of said client device, wherein a frequent user is granted enhanced trust over an infrequent user.

28. The method of claim 18, further comprising the step of:
granting or denying service and/or access according to said level of trust.

29. The method of claim 19, further comprising the step of:
when said selected user requests service and/or access from said client device, said requested service or access requiring secondary authentication, accepting a statement showing frequent use of said device by said selected user as a credential for said secondary authentication.

30. The method of claim 19, further comprising the step of;
requiring provision of a statement showing frequent use of said device by said selected user as a credential for changing account preferences.

31. The method of claim 19, further comprising the step of:
accepting a statement showing frequent use of said device by said selected user as a credential to resolve a conflict between said selected user and a second user using a second client device, wherein said second client device lacks usage history for said selected user.

32. The method of claim 19, further comprising the step of:
accepting a statement showing frequent use of said device by said selected user as a credential in place of said selected user's password when said selected user's password is stolen and changed by a third party using a second client device, wherein said second client device lacks usage history for said selected user.

33. The method of claim 19, further comprising the step of:
discouraging attacks by hackers based on said statements.

34. The method of claim 33, wherein said step of discouraging attacks by hackers comprises:
extending a time period associated with authentication of said selected user's password when provided from a second client device, wherein said second client device lacks usage history for said selected user.

35. An apparatus for establishing trust according to historical usage of selected hardware across a plurality of log in sessions, comprising:
means for tracking information unique to each log in for at least one selected client device;
means for determining an identity unique to said selected client device associated with each said log in;
means for comparing said identity of said client device to a stored use profile associated with a user, said stored use profile comprising a list of client devices used by said user;
means for determining whether said identified client device matches one of client devices listed in said stored use profile;
means for providing a usage history for said selected client device, wherein said usage history is changeable as a function of any of frequency and number of tracked log ins associated to said selected client device and said determined identity of said selected client device for each said log in;
means for updating any of said usage history and said stored use profile as a result of each said log in; and
means for extending an increase in trust to said user based, at least in part, on any of said frequency and said number of tracked lop ins associated with said selected client device for said user.

36. A method for establishing trust across a plurality of log in sessions for one or more client devices according to historical usage of selected hardware, comprising the steps of:
tracking information unique to each log in for at least a selected client device of said client devices;
determining an identity unique to said selected client device associated with each said log in;
comparing said identity of said client device to a stored use profile associated with a user, said stored use profile comprising a list of client devices used by said user;
determining whether said identified client device matches one of client devices listed in said stored use profile;
providing a usage history for said selected client device, wherein said usage history is changeable as a function of frequency of tracked log ins associated with said selected client device and said determined identity of said selected client device for each said log in, wherein said usage history comprises at least one statement signed by an issuer, wherein said issuer comprises any of an authenticating server and a third party, wherein said step of providing said usage history comprises the steps of
creating said statement by said issuer,
downloading said statement from said issuer and storing on said client device, and
furnishing said usage history by said client with a request for service and/or access;
updating any of said usage history and said stored use profile as a result of each said log in; and
extending trust to said user at a level at least partially based on said user's history of use of said selected client device.

37. A method for establishing trust according to historical usage of selected hardware across a plurality of log in sessions, said method implemented on computer-readable code embodied in a tangible medium associated with a computer program product, comprising the steps of:
tracking information unique to each log in for at least a selected client device;
determining an identity unique to said selected client device associated with each said log in;
comparing said identity of said client device to a stored use profile associated with a user, said stored use profile comprising a list of client devices used by said user;
determining whether said identified client device matches one of client devices listed in said stored use profile;
providing a usage history for said selected client device, wherein said usage history is changeable as a function of frequency of tracked log ins associated to said selected client device and said determined identity of said selected client device for each said log in, wherein, said usage history comprises at least one statement signed by an issuer, wherein said issuer comprises any of an authenticating server and a third party, wherein said step of providing said usage history comprises steps of
creating said statement by said issuer,
downloading said statement from said issuer and storing on said client device, and
furnishing said usage history by said client with a request for service and/or access;
updating any of said usage history and said stored use profile as a result of each said log in; and
extending trust to said user at a level at least partially based on said user's history of use of said selected client device.

* * * * *